UNITED STATES PATENT OFFICE.

ALFRED FORD, OF LONDON, ENGLAND, ASSIGNOR OF ONE-HALF TO JACOB AYTON ARCHER, OF SAME PLACE.

MATERIAL APPLICABLE AS A WATER-PROOF COVERING FOR ROOFS, &c.

SPECIFICATION forming part of Letters Patent No. 342,345, dated May 25, 1886.

Application filed June 16, 1885. Serial No. 168,899. (Specimens.) Patented in England May 15, 1885, No. 5,993; in Germany June 9, 1885, No. 33,790; in France June 10, 1885, No. 169,480, and in Canada July 14, 1885, No. 22,081.

*To all whom it may concern:*

Be it known that I, ALFRED FORD, a subject of the Queen of Great Britain, residing at London, England, gentleman, have invented a new and useful Improved Material Applicable as a Water-Proof Covering for Roofs and other such like Purposes, of which the following is a specification.

The object of this invention is to provide a water-proof material which will be but little liable to be injured by oxidation by the atmosphere, and which is light, flexible, and transparent. For this purpose I employ wire-gauze, preferably iron, coated with a tough water-proof and elastic varnish or medium of the kind hereinafter described, so as to cover the wire and close the meshes. To so coat the sheets of wire-gauze with the varnish or medium, I repeatedly dip them into the varnish, and after each dipping allow the varnish to dry until the meshes of the wire-work have been perfectly filled and the wire covered and the whole rendered water-proof.

The varnish or medium I find it advantageous to employ is pure linseed-oil, which has been previously oxidized and endued with drying powers, and thickened in a suitable manner—such as the following, videlicet: I take refined linseed-oil, and having imparted to it the property of drying quickly by any well-known method—such as by subjecting it to the action of litharge or other siccative—I allow it to rest until it has become clear, and then subject it to agitation by means of an air-blast in a closed tank, (or by any other suitable mode—such as by long exposure to the atmosphere and stirring)—until it has assumed a consistence of cream, or thereabout. The oil so treated is then fit for use for the above-named purpose.

Wire-work so prepared is sufficiently translucent to admit light, is water-proof and sun-proof, comparatively inexpensive, and can easily be applied to the frame-work of a roofing, or of windows, or used for other such like purposes, and as the improved material is not liable to be injured by unequal expansion or contraction between its component parts (a condition which does not exist in iron and glass roofs) it is specially applicable for roofing purposes. The material can be colored, without affecting its transparency, by the use of any of the well-known transparent colors.

I have described the use of a varnish or medium prepared from linseed-oil, as above named, as giving excellent results in practice; but it will be obvious that other varnishes or waterproofing mixtures may be employed, although with inferior results.

In some cases, where the roofing might be exposed to accident by the falling upon it of stray pieces of hot cinder or wood, I coat the surface with powdered glass in the following manner: I either mix the glass, in a fine state of division, with the last coat of material with which I dress the wire, or while the latter is in an adhesive state I brush powdered glass over the surface.

Having now particularly described and ascertained the nature of the said invention and in what manner the same is to be performed, I declare that what I claim is—

1. A water-proof and translucent covering for roofs and for other like purposes, consisting of wire-gauze coated with an oxidized compound of linseed-oil and litharge or other siccative, which covers up the wire and fills the meshes, substantially as described.

2. A water-proof and translucent covering for roofs and for other like purposes, consisting of wire-gauze coated with an oxidized compound of linseed-oil and litharge or other siccative, which covers up the wire and fills the meshes, and with powdered glass, substantially as described.

ALFRED FORD.

Witnesses:
B. BRADY,
A. ALBUTT.